United States Patent
Lyu et al.

(10) Patent No.: US 12,556,301 B2
(45) Date of Patent: Feb. 17, 2026

(54) WIRELESS COMMUNICATION METHOD AND APPARATUS

(71) Applicant: QUECTEL WIRELESS SOLUTIONS CO., LTD., Shanghai (CN)

(72) Inventors: Ling Lyu, Shanghai (CN); Zheng Zhao, Shanghai (CN); Zhongzhi Yang, Shanghai (CN)

(73) Assignee: Quectel Wireless Solutions Co., Ltd., Shanghai (CN)

( * ) Notice: Subject to any disclaimer, the term of this patent is extended or adjusted under 35 U.S.C. 154(b) by 0 days.

(21) Appl. No.: 18/999,941

(22) Filed: Dec. 23, 2024

(65) Prior Publication Data
US 2025/0125900 A1 Apr. 17, 2025

Related U.S. Application Data

(63) Continuation of application No. 18/389,735, filed on Dec. 19, 2023, now Pat. No. 12,191,990, which is a
(Continued)

(30) Foreign Application Priority Data
Sep. 15, 2022 (CN) .......................... 202211123568.3

(51) Int. Cl.
  *H04W 72/12* (2023.01)
  *H04L 1/00* (2006.01)
  *H04L 1/1812* (2023.01)

(52) U.S. Cl.
  CPC .......... *H04L 1/0006* (2013.01); *H04L 1/1812* (2013.01)

(58) Field of Classification Search
  CPC ... H04L 1/0006; H04L 1/0007; H04L 1/0009; H04L 1/1812; H04L 1/1822; H04L 1/1825; H04L 1/1896; H04L 2001/0092
  See application file for complete search history.

(56) References Cited

U.S. PATENT DOCUMENTS

| | | | |
|---|---|---|---|
| 2013/0195031 A1 | 8/2013 | Hessler et al. | |
| 2015/0141027 A1 | 5/2015 | Tsui et al. | |

(Continued)

FOREIGN PATENT DOCUMENTS

| | | |
|---|---|---|
| CN | 101651957 A | 2/2010 |
| CN | 108419275 A | 8/2018 |

(Continued)

OTHER PUBLICATIONS

Extended European Search Report in European Appln. No. 22955900.0, mailed on Nov. 4, 2024, 37 pages.
(Continued)

*Primary Examiner* — Phuc H Tran
(74) *Attorney, Agent, or Firm* — Fish & Richardson P.C.

(57) ABSTRACT

The present application provides a wireless communication method. One example method includes: sending, by a first device, a first transport block, where a size of the first transport block is determined based on a product of an initial size of the first transport block and a first parameter, the first parameter is determined based on one or more of the following parameters: a second parameter that indicates channel transmission quality corresponding to the first transport block; or a third parameter that indicates a channel transmission delay corresponding to the first transport block.

15 Claims, 4 Drawing Sheets

Related U.S. Application Data continuation of application No. PCT/CN2022/127851, filed on Oct. 27, 2022.

(56) References Cited

U.S. PATENT DOCUMENTS

| | | |
|---|---|---|
| 2016/0094310 A1 | 3/2016 | Xia |
| 2018/0351625 A1 | 12/2018 | Xu et al. |
| 2019/0150016 A1 | 5/2019 | Kittichokechai et al. |
| 2020/0022141 A1 | 1/2020 | Kang et al. |
| 2020/0186293 A1 | 6/2020 | You |
| 2022/0166536 A1 | 5/2022 | Ma |
| 2022/0322398 A1* | 10/2022 | Tsai ............... H04W 72/23 |
| 2022/0322414 A1* | 10/2022 | Khoshkholgh Dashtaki ............ H04W 56/0045 |
| 2023/0163893 A1* | 5/2023 | Shokri Razaghi .... H04L 1/1854 370/329 |
| 2023/0336628 A1* | 10/2023 | Xu ............... H04L 1/1887 |
| 2024/0008123 A1* | 1/2024 | Ying ............... H04L 5/0055 |

FOREIGN PATENT DOCUMENTS

| | | |
|---|---|---|
| CN | 112152761 A | 12/2020 |
| CN | 112491511 A | 3/2021 |
| CN | 114902761 A | 8/2022 |
| CN | 115242355 A | 10/2022 |
| JP | 4434019 B2 | 3/2010 |
| WO | WO 2019195446 A1 | 10/2019 |
| WO | WO 2020191625 A1 | 10/2020 |
| WO | WO 2020192700 A1 | 10/2020 |
| WO | WO 2022006914 A1 | 1/2022 |
| WO | WO 2022021007 A1 | 2/2022 |
| WO | WO 2022028361 | 2/2022 |
| WO | WO 2022028549 A1 | 2/2022 |
| WO | WO 2022171773 A1 | 8/2022 |

OTHER PUBLICATIONS

Hodson et al., "VSAT Networks and Wide Area Diversity," Proceedings of the MM (Millimetre) conferences, Oct. 14-15, 1992, pp. 104-109.

International Search Report and Written Opinion in International Appln. No. PCT/CN2022/127851, mailed on Jun. 10, 2023, 22 pages (with English machine translation).

Office Action in Chinese Appln. No. 202211123568.3, mailed on Apr. 2, 2023, 6 pages (with English translation).

Office Action in Chinese Appln. No. 202211123568.3, mailed on Dec. 5, 2022, 16 pages (with English machine translation).

Office Action in Chinese Appln. No. 202211123568.3, mailed on Jan. 19, 2023, 17 pages (with English machine translation).

Office Action in Chinese Appln. No. 202211123568.3, mailed on Nov. 3, 2022, 22 pages (with English machine translation).

Panasonic, "HARQ enhancement for NTN," 3GPP TSG RAN WG1 #106bis-e, R1-2109868, E-meeting, Oct. 11-19, 2021, 11 pages.

Office Action in Chinese Appln. No. 202211601193.7, mailed on Apr. 25, 2025, 13 pages (with English translation).

Ericsson, "On MCS/transport Block Size Determination for PDSCH," 3GPP TSG-RAN WG1 Meeting #89, R1-1709093, Hangzhou, China, May 15-19, 2017, 5 pages.

Office Action in Korean Appln. No. 10-2025-7012302, mailed on Jul. 18, 2025, 9 pages (with English translation).

Office Action in Japanese Appln. No. 2025-515880, mailed on Aug. 5, 2025, 8 pages (with English translation).

* cited by examiner

WIRELESS COMMUNICATION METHOD AND APPARATUS

CROSS-REFERENCE TO RELATED APPLICATIONS

This application is a continuation of U.S. application Ser. No. 18/389,735, filed on Dec. 19, 2023, which is a continuation of International Application No. PCT/CN2022/127851, filed on Oct. 27, 2022, which claims priority to Chinese Patent Application No. 202211123568.3, filed on Sep. 15, 2022. All of the aforementioned applications are incorporated herein by reference in their entireties.

TECHNICAL FIELD

The present application relates to the technical field of communications, and more specifically, to a wireless communication method and apparatus.

BACKGROUND

Some communication systems (such as, a non-terrestrial network (NTN) system) have large transmission delays. In such communication systems, when a device sends a transport block, enabling of a hybrid automatic repeat request (HARQ) process may cause large overheads. How to reduce retransmission overheads in such communication systems is an urgent problem to be solved.

SUMMARY

The present application provides a wireless communication method and apparatus, which helps reduce retransmission overheads.

According to a first aspect, a wireless communication method is provided, including: sending, by a first device, a first transport block, where a size of the first transport block is determined based on a first parameter, the first parameter is determined based on one or more of the following parameters: a second parameter, used to indicate channel transmission quality corresponding to the first transport block; and a third parameter, used to indicate a channel transmission delay corresponding to the first transport block.

According to a second aspect, a wireless communication method is provided, including: receiving, by a second device, a first transport block, where a size of the first transport block is determined based on a first parameter, the first parameter is determined based on one or more of the following parameters: a second parameter, used to indicate channel transmission quality corresponding to the first transport block; and a third parameter, used to indicate a channel transmission delay corresponding to the first transport block.

According to a third aspect, a wireless communication method is provided, including: sending, by a first device, first information, where the first information is used to indicate enabling or disabling of a HARQ process corresponding to first data.

According to a fourth aspect, a wireless communication method is provided, including: receiving, by a second device, first information, where the first information is used to indicate enabling or disabling of a HARQ process corresponding to first data.

According to a fifth aspect, a wireless communications apparatus is provided, where the apparatus is a first device, and the first device includes: a sending unit, configured to send a first transport block, where a size of the first transport block is determined based on a first parameter, the first parameter is determined based on one or more of the following parameters: a second parameter, used to indicate channel transmission quality corresponding to the first transport block; and a third parameter, used to indicate a channel transmission delay corresponding to the first transport block.

According to a sixth aspect, a wireless communications apparatus is provided, where the apparatus is a second device, and the second device includes: a receiving unit, configured to receive a first transport block, where a size of the first transport block is determined based on a first parameter, the first parameter is determined based on one or more of the following parameters: a second parameter, used to indicate channel transmission quality corresponding to the first transport block; and a third parameter, used to indicate a channel transmission delay corresponding to the first transport block.

According to a seventh aspect, a wireless communications apparatus is provided, where the apparatus is a first device, and the first device includes: a sending unit, configured to send first information, and the first information is used to indicate enabling or disabling of a HARQ process corresponding to first data.

According to an eighth aspect, a wireless communications apparatus is provided, where the apparatus is a second device, and the second device includes: a receiving unit, configured to receive first information, where the first information is used to indicate enabling or disabling of a HARQ process corresponding to first data.

According to a ninth aspect, a communications apparatus is provided, including a memory and a processor, where the memory is configured to store a program, and the processor is configured to call the program in the memory to perform the method according to any one of the first aspect to the fourth aspect.

According to a tenth aspect, an apparatus is provided, including a processor configured to call a program from a memory to perform the method according to any one of the first aspect to the fourth aspect.

According to an eleventh aspect, a chip is provided, including a processor configured to call a program from a memory to cause a device installed with the chip to perform the method according to any one of the first aspect to the fourth aspect.

According to a twelfth aspect, a computer-readable storage medium is provided, the computer-readable storage medium storing a program that causes a computer to perform the method according to any one of the first aspect to the fourth aspect.

According to a thirteenth aspect, a computer program product is provided, and the computer program product includes a program that causes a computer to perform the method according to any one of the first aspect to the fourth aspect.

According to a fourteenth aspect, a computer program is provided, where the computer program causes a computer to perform the method according to any one of the first aspect to the fourth aspect.

In the embodiments of the present application, when a first device sends a transport block to a second device, a size of the transport block is determined based on channel transmission quality and/or a channel transmission delay. When the channel transmission quality is good or the channel transmission delay is long, increasing the size of the transport block helps reduce a quantity of retransmissions, signaling overheads or power consumption, thereby reducing retransmission overheads.

DETAILED DESCRIPTION OF THE EMBODIMENTS

Figure 1:
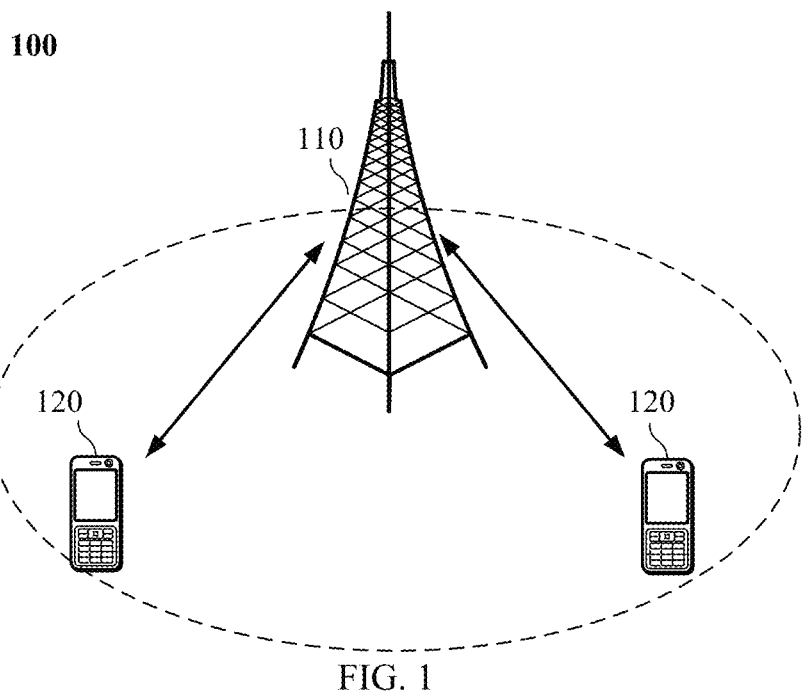
FIG. 1 shows a wireless communications system to which an embodiment of the present application is applied.

The following describes the technical solutions in the embodiments of the present application with reference to the accompanying drawings in the embodiments of the present application. Apparently, the described embodiments are some rather than all of the embodiments of the present application. For the embodiments of the present application, all other embodiments obtained by a person of ordinary skill in the art without creative efforts fall within the protection scope of the present application.

The embodiments of the present application may be applied to various communications systems. For example, the embodiments of the present application may be applied to a global system of mobile communication (GSM), a code division multiple access (CDMA) system, a wideband code division multiple access (WCDMA) system, a general packet radio service (GPRS), a long term evolution (LTE) system, an advanced long term evolution (LTE-A) system, a new radio (NR) system, an evolution system of an NR system, an LTE-based access to unlicensed spectrum (LTE-U) system, an NR-based access to unlicensed spectrum (NR-U) system, an NTN system, a universal mobile telecommunications system (UMTS), a wireless local area network (WLAN), wireless fidelity (Wi-Fi), and a 5th generation (5G) communications system. The embodiments of the present application may be further applied to another communications system, such as a future communications system. The future communications system may be, for example, a 6th generation (6G) mobile communications system, or a satellite communications system.

Conventional communications systems support a limited number of connections and are also easy to implement. However, with the development of communications technologies, a communications system may support not only conventional cellular communication but also one or more types of communication in another type. For example, the communications system may support one or more types of the following communication: device-to-device (D2D) communication, machine-to-machine (M2M) communication, machine type communication (MTC), vehicle-to-vehicle (V2V) communication, vehicle-to-everything (V2X) communication, and the like. The embodiments of the present application may also be applied to a communications system that supports the foregoing communication manners.

The communications system in the embodiments of the present application may be applied to a carrier aggregation (CA) scenario, a dual connectivity (DC) scenario, or a standalone (SA) networking scenario.

The communications system in the embodiments of the present application may be applied to an unlicensed spectrum. The unlicensed spectrum may also be considered as a shared spectrum. Alternatively, the communications system in the embodiments of the present application may be applied to a licensed spectrum. The licensed spectrum may also be considered as a dedicated spectrum.

The embodiments of the present application may be applied to a terrestrial network (TN) system, or may be applied to an NTN system. For example, the NTN system may include a 4G-based NTN system, an NR-based NTN system, an internet of things (IoT)-based NTN system, and a narrow band-internet of things (NB-IoT)-based NTN system.

The communications system may include one or more terminal devices. The terminal device mentioned in the embodiments of the present application may also be referred to as a user equipment (UE), an access terminal, a subscriber unit, a subscriber station, a mobile site, a mobile station (MS), a mobile terminal (MT), a remote station, a remote terminal, a mobile device, a user terminal, a terminal, a wireless communications device, a user agent, a user apparatus, or the like.

In some embodiments, the terminal device may be a station (ST) in a WLAN. In some embodiments, the terminal device may be a cellular phone, a cordless phone, a session initiation protocol (SIP) phone, a wireless local loop (WLL) station, a personal digital assistant (PDA) device, a handheld device having a wireless communication function, a computing device or any other processing device connected to a wireless modem, a vehicle-mounted device, a wearable device, a terminal device in a next generation communications system (such as an NR system), a terminal device in a future evolved public land mobile network (PLMN), or the like.

In some embodiments, the terminal device may be a device providing a user with voice and/or data connectivity. For example, the terminal device may be a handheld device, a vehicle-mounted device, or the like having a wireless connection function. In some specific examples, the terminal device may be a mobile phone, a tablet computer (pad), a notebook computer, a palmtop computer, a mobile internet device (MID), a wearable device, a virtual reality (VR) device, an augmented reality (AR) device, a wireless terminal in industrial control, a wireless terminal in self driving, a wireless terminal in remote medical surgery, a wireless terminal in a smart grid, a wireless terminal in transportation safety, a wireless terminal in smart city, a wireless terminal in smart home, or the like.

In some embodiments, the terminal device may be deployed on land. For example, the terminal device may be deployed indoors or outdoors. In some embodiments, the terminal device may be deployed on water, for example, on a ship. In some embodiments, the terminal device may be deployed in the air, for example, on an airplane, a balloon, and a satellite.

In addition to the terminal device, the communications system may further include one or more network devices. The network device in the embodiments of the present application may be a device for communicating with the terminal device. The network device may also be referred to as an access network device or a wireless access network device. The network device may be, for example, a base station. The network device in the embodiments of the present application may be a radio access network (RAN) node (or device) that connects the terminal device to a wireless network. The base station may broadly cover various names in the following, or may be interchangeable with one of the following names, for example: a NodeB, an evolved NodeB (eNB), a next generation NodeB (gNB), a relay station, an access point, a transmitting and receiving point (TRP), a transmitting point (TP), a master MeNB, a secondary SeNB, a multi-standard radio (MSR) node, a home base station, a network controller, an access node, a radio node, an access point (AP), a transmission node, a transceiver node, a base band unit (BBU), a remote radio unit (RRU), an active antenna unit (AAU), a remote radio head (RRH), a central unit (CU), a distributed unit (DU), a positioning node, or the like. The base station may be a macro base station, a micro base station, a relay node, a donor node, or the like, or a combination thereof. Alternatively, the base station may be a communications module, a modem, or a chip disposed in the device or apparatus described above. Alternatively, the base station may be a mobile switching center, a device that functions as a base station in D2D, V2X, and M2M communications, a network-side device in a 6G network, a device that functions as a base station in a future communications system, or the like. The base station may support networks of the same or different access technologies. A specific technology and specific device form used by the network device are not limited in the embodiments of the present application.

The base station may be fixed or mobile. For example, a helicopter or drone may be configured to act as a mobile base station, and one or more cells may move according to the position of the mobile base station. In other examples, a helicopter or drone may be configured to serve as a device in communication with another base station.

In some deployments, the network device in the embodiments of the present application may be a CU or a DU, or the network device includes a CU and a DU. The gNB may further include an AAU.

As an example rather than limitation, in the embodiments of the present application, the network device may have a mobile feature, for example, the network device may be a movable device. In some embodiments of the present application, the network device may be a satellite or a balloon station. In some embodiments of the present application, the network device may alternatively be a base station located on land, water, or the like.

In the embodiments of the present application, the network device may provide a service for a cell, and the terminal device communicates with the network device by using a transmission resource (for example, a frequency domain resource or a spectrum resource) used by the cell. The cell may be a cell corresponding to the network device (for example, a base station). The cell may belong to a macro base station or belong to a base station corresponding to a small cell. The small cell herein may include: a metro cell, a micro cell, a pico cell, a femto cell, or the like. These small cells feature small coverage and low transmit power, and are suitable for providing a high-speed data transmission service.

For example, FIG. 1 is a schematic diagram of an architecture of a communications system according to an embodiment of the present application. As shown in FIG. 1, a communications system 100 may include a network device 110, and the network device 110 may be a device that communicates with a terminal device 120 (or referred to as a communications terminal or a terminal). The network device 110 may provide communication coverage for a specific geographic area, and may communicate with a terminal device within the coverage area.

FIG. 1 exemplarily shows one network device and two terminal devices. In some embodiments of the present application, the communications system 100 may include a plurality of network devices and another number of terminal devices may be included within a coverage area of each network device, which is not limited in embodiments of the present application.

Figure 2:
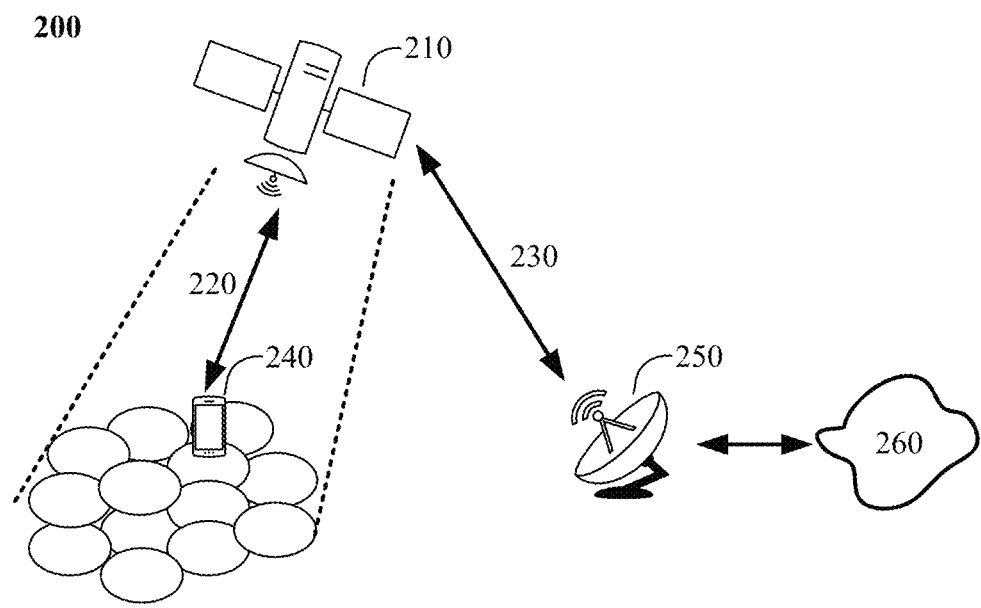
FIG. 2 is an NTN system to which an embodiment of the present application is applied.

For example, FIG. 2 is a schematic diagram of an architecture of the foregoing NTN system. The NTN system 200 shown in FIG. 2 uses a satellite 210 as an air platform. As shown in FIG. 2, a satellite radio access network includes the satellite 210, a service link 220, a feeder link 230, a terminal device 240, a gateway 250, and a network 260 including a base station and a core network.

The satellite 210 is a spacecraft based on a space platform. The service link 220 is a link between the satellite 210 and the terminal device 240. The feeder link 230 is a link between the gateway 250 and the satellite 210. The earth-based gateway 250 connects the satellite 210 to a base station or a core network, depending on selection of an architecture.

The NTN architecture shown in FIG. 2 is a bent pipe transponder architecture. In this architecture, the base station is located on the earth behind the gateway 250, and the satellite 210 acts as a relay. The satellite 210 operates as a repeater for forwarding signals of the feeder link 230 to the service link 220, or forwarding signals of the service link 220 to the feeder link 230. In other words, the satellite 210 does not have a function of a base station, and communication between the terminal device 240 and the base station in the network 260 needs to be forwarded by using the satellite 210.

Figure 3:
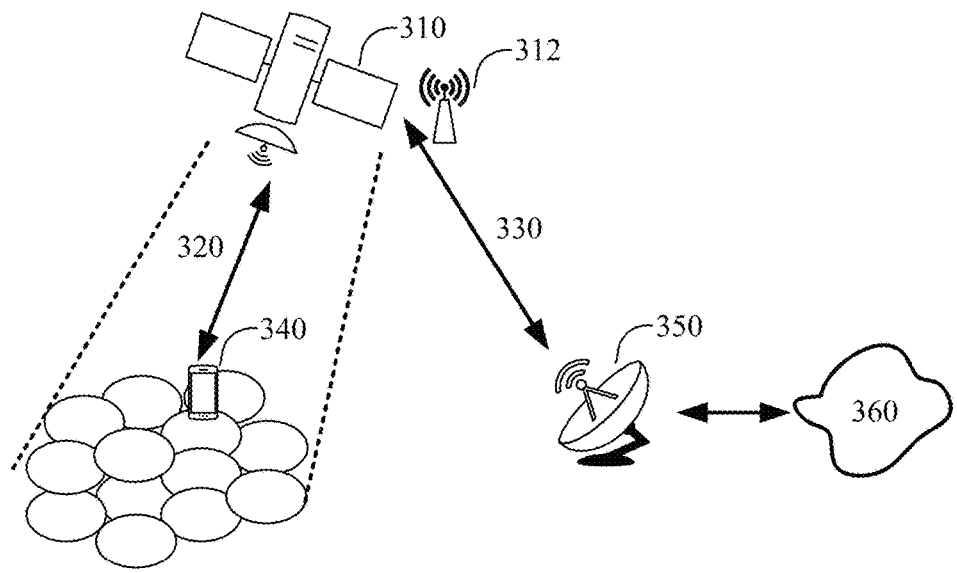
FIG. 3 is another NTN system to which an embodiment of the present application is applied.

For example, FIG. 3 is a schematic diagram of another architecture of the NTN system. The NTN system 300 shown in FIG. 3 also uses a satellite 310 as an air platform. Different from FIG. 2, a base station 312 is provided on the satellite 310, and a network 360 behind a gateway 350 includes only a core network.

The NTN architecture shown in FIG. 3 is a regenerative transponder architecture. In this architecture, the satellite 310 carries the base station 312, and may be directly connected to an earth-based core network by using a link. The satellite 310 has a function of a base station, and a terminal device 340 may directly communicate with the satellite 310. Thus, the satellite 310 may be referred to as a network device.

The communications system in the architecture shown in FIG. 2 or FIG. 3 may include a plurality of network devices, and another quantity of terminal devices may be included in coverage of each network device, which is not limited in the embodiment of the present application.

In the embodiments of the present application, the wireless communications systems shown in FIG. 1 to FIG. 3 may further include another network entity such as a mobility management entity (MME) or an access and mobility management function (AMF), which is not limited in the embodiment of the present application.

It should be understood that a device having a communication function in a network/system in the embodiments of the present application may be referred to as a communications device. The communications system 100 shown in FIG. 1 is used as an example. A communications device may include a network device 110 and a terminal device 120 having a communication function, and the network device 110 and the terminal device 120 may be specific devices described above, and details are not described herein. The communications device may further include other devices in the communications system 100, such as a network controller, a mobility management entity, and other network entities, which is not limited in the embodiments of the present application.

For ease of understanding, some related technical knowledge related to the embodiments of the present application is first introduced. The following related technologies, as optional solutions, may be randomly combined with the technical solutions of the embodiments of the present application, all of which fall within the protection scope of the embodiments of the present application. The embodiments of the present application include at least part of the following content.

With the development of communications technologies, a communications system (for example, 5G) will have a market potential for integrating a satellite and a terrestrial network infrastructure. For example, 5G standards make an NTN, including a satellite segment, become a part of recognized 3rd generation partnership project (3GPP) 5G connection infrastructure.

Communications satellites are classified into low earth orbit (LEO) satellites, medium earth orbit (MEO) satellites, geostationary earth orbit (GEO) satellites, high elliptical orbit (HEO) satellites, and the like depending on different orbital altitudes. LEO is an earth-centered orbit with a height of 2000 km or less, or at least 11.25 periods per day, and an eccentricity being less than 0.25. Most artificial objects in outer space are located in LEO. The LEO satellites operate around the earth at a high speed (mobility), but on a predictable or definite orbit.

Satellites with different orbital altitudes have different orbital periods.

LEO has a typical height ranging from 250 km to 1500 km, and an orbital period ranging from 90 minutes to 120 minutes.

MEO has a typical height ranging from 5000 km to 25000 km, and an orbital period ranging from 3 hours to 15 hours.

GEO has a height of about 35786 km, and an orbital period of 24 hours.

An NTN is a network or a network segment that uses a radio frequency (RF) resource on a satellite or an unmanned aerial system (UAS) platform. A typical scenario of accessing an NTN by a terminal device involves an NTN transparent payload or an NTN regenerative payload. FIG. 2 and FIG. 3 show architectures of two NTN systems by using a satellite as an example. The bent pipe transponder architecture shown in FIG. 2 corresponds to the NTN transparent payload, and the regenerative transponder architecture shown in FIG. 3 corresponds to the NTN regenerative payload.

In an NTN system, an NTN node (for example, a satellite) is located more than hundreds of kilometers away from the surface of the earth, and a round trip time (RTT) from a terminal device to the satellite is relatively long. For example, a round trip time from a UE to a satellite (UE-sat RTT) is much longer than a round trip time from a UE to a base station (for example, gNB) in a terrestrial network. Therefore, a round trip delay (RTD) of a terminal device in an NTN system is much larger than an RTD in a terrestrial communications network (such as NR).

The foregoing describes various communications systems, and a HARQ protocol is one of the most important functions in a communications system (such as an NR system). Together with link adaptation, HARQ implements efficient, reliable and low-latency data transmission in a system. The link adaptation may be performed by means of channel state information (CSI) feedback and HARQ acknowledgement (ACK)/HARQ negative acknowledgement (NACK).

According to the HARQ protocol, a terminal device may send or retransmit new data according to feedback from a base station. A HARQ function is used to ensure transmission between the terminal device and the base station at a physical layer. A HARQ process is designed based on the physical (PHY) layer and a media access control (MAC) layer, for example, a MAC entity includes a HARQ entity for each serving cell.

A current HARQ process is mainly designed for a terrestrial network. A propagation delay for a HARQ round trip time (HARQ-RTT) is generally limited to within 1 millisecond. The HARQ-RTT is a time interval between initial transmission and retransmission.

The HARQ protocol allows a plurality of parallel HARQ processes (also referred to as processing). Each HARQ entity maintains 16 downlink HARQ processes (or processors) or 2 NB-IoT HARQ processes as required by some technical specifications (for example, 3GPP TS 38.321 MAC specifications). Each HARQ process is associated with a HARQ process identity (ID). The HARQ entity directs HARQ information and a related transport block (TB) received on a downlink shared channel (DL-SCH) to a corresponding HARQ process. Generally, a duration period corresponding to a quantity of HARQ processes is greater than a propagation delay. In other words, a quantity of HARQ processes supported by a current HARQ protocol may offset a propagation delay in a terrestrial network.

An operation process of HARQ may be described by using the following example. First, in downlink transmission, uplink feedback or HARQ feedback is performed in response to downlink transmission/retransmission on a physical uplink control channel (PUCCH) or a physical uplink shared channel (PUSCH). Then, in uplink transmission, uplink HARQ retransmission may be triggered without waiting for feedback from previous transmission. Each link transmission may be associated with one HARQ process ID.

The HARQ process ID is used to identify a unique HARQ process. A same HARQ process ID may be used to identify retransmission of data. Therefore, a communications device can perform soft combining by using repeated transmission. In order to perform soft combining, an erroneously received encoded data block is typically stored in a receiver (such as a soft buffer) rather than discarded. When a retransmitted block is received, the communications device combines the two blocks. The soft buffer may be implemented as a buffer or a memory for storing soft combined data.

As mentioned above, a HARQ entity directs a received transport block to a corresponding HARQ process. HARQ may be retransmitted in a unit of the transport block. Generally, in each transmission time interval (TTI), each HARQ process processes only one transport block. A transport block is in a one-to-one correspondence with a HARQ process. In a case of spatial multiplexing, two transport blocks are transmitted in parallel in one TTI, and each transport block has its own independent HARQ ACK information and is processed by using a different HARQ process. In other words, when spatial multiplexing is used, one HARQ entity includes two HARQ process sets. In some communications systems, the HARQ may further be retransmitted in a unit of a specific quantity of code block groups. A transport block is formed by a plurality of code block groups, and the transport block needs to be split during retransmission.

One MAC PDU is carried in each transport block transmitted by a communications device. The following briefly describes a generation process of a MAC PDU at a data link layer (L2 layer) with reference to FIG. 4 by using an NR system as an example.

Figure 4:
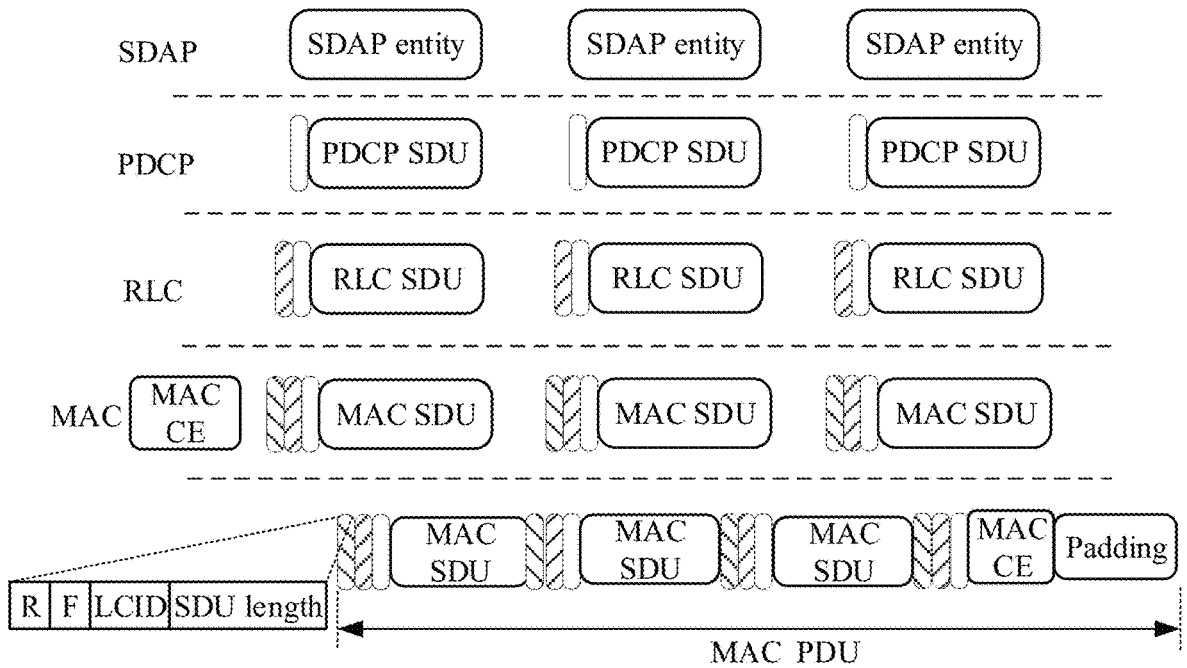
FIG. 4 is a schematic diagram of a generation process of a media access control protocol data unit (MAC PDU).

As shown in FIG. 4, the L2 layer includes four transport layers: a service data adaption protocol (SDAP) layer, a packet data convergence protocol (PDCP) layer, a radio link control (RLC) layer, and a MAC layer that are in sequence.

At the SDAP layer, an SDAP entity maps quality of service (QOS) to a data radio bearer (DRB), and transmits the DRB to the PDCP layer.

At the PDCP layer, after a service data unit (SDU) is headered, data is compressed and encrypted to form a PDCP PDU, which is then transmitted to the RLC layer.

At the RLC layer, the PDCP PDU serves as the SDU of RLC, and is segmented and reassembled after being headered. Transmission is performed in different modes according to a service characteristic to form a PDU of the RLC layer. The RLC operation modes include three types: a transport mode (TM), an acknowledged mode (AM), and an unacknowledged mode (UM).

At the MAC layer, after data is multiplexed and scheduled, the headered MAC SDU is cascaded to form a MAC PDU. The MAC layer further includes a media access control element (MAC CE).

The MAC PDU shown in FIG. 4 includes three MAC SDUs, one MAC CE, and a padding block. Each MAC SDU or MAC CE has three headers, which are respectively formed at the PDCP layer, the RLC layer, and the MAC layer.

A subheader of the MAC layer includes a reserved bit R, a byte length F, a logical channel ID (LCID), and an SDU length.

R is also referred to as reserved bit. R is 1 bit, which is generally set to 0.

F field is 1 bit. There is one F field per MAC subheader except for fixed-sized MAC CEs and padding. When a value of F is 0, it indicates that a length field of a subsequent SDU is 8 bits. When a value of F is 1, it indicates that the length field of the subsequent SDU is 16 bits.

LCID is 6 bits. LCID defines a MAC SDU, a MAC CE type and padding in a logical channel. Each MAC subheader has only one LCID.

The HARQ process described above is designed for a terrestrial network, and a propagation delay is generally limited to 1 millisecond. However, some communications systems have a relatively long propagation delay. These communications systems are, for example, NTN systems. An orbital height of GEO is used as an example. Because a distance between communication devices is relatively long, a propagation delay of round trip transmission is about 500 milliseconds.

If NR downlink (DL) is used in a scenario of GEO satellite communication, a propagation delay of 500 milliseconds results in a very long HARQ RTT. Due to an increase in HARQ RTT, an increase in end-to-end delay cannot meet a quality of service requirement of a retransmission packet.

Further, a percentage of available peak throughput to a total channel capacity is very low in 16 HARQ processes and 1 millisecond slot duration period supported by the NR. In other words, a quantity of HARQ processes supported by a current HARQ protocol is not enough to offset a potentially large propagation delay in an NTN system. Therefore, a current HARQ mechanism may not be feasible for a communications system with a propagation delay being far greater than a duration period of the quantity of HARQ processes.

To meet a relatively long HARQ RTT, a minimum quantity of required HARQ processes may be increased. However, increasing the quantity of HARQ processes increases overheads of HARQ signaling and power consumption, which may cause adverse additions such as signaling redundancy, processor load increase, and network congestion.

In addition, increasing the quantity of HARQ processes may also result in higher soft buffer requirements. As described above, in the HARQ protocol, a soft buffer needs to be provided for a communications device to support soft combining. To meet an increase in the quantity of HARQ processes, a higher requirement is imposed on a soft buffer space of the terminal device, thereby causing higher implementation complexity and higher costs for the terminal device.

Therefore, the current HARQ mechanism is not suitable for a communications system with a large propagation delay. In these communications systems, how to reduce overheads caused by retransmission becomes an urgent problem to be solved.

In view of this, an embodiment of the present application provides a wireless communication method. According to this method, a communications device may adaptively adjust, based on channel transmission quality and/or a channel transmission delay, a size of a transport block to be transmitted, thereby helping to reduce retransmission overheads. The following describes the embodiment of the present application in detail with reference to FIG. 5.

Figure 5:
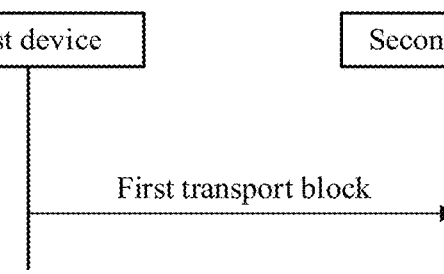
FIG. 5 is a schematic diagram of a wireless communication method according to an embodiment of the present application.

The communication method shown in FIG. 5 is described from a perspective of communication between a first device and a second device. The first device and the second device in FIG. 5 may be two communications devices at two ends of a communication link. The first device is a transmit end of the communication link, and the second device is a receive end of the communication link.

In some embodiments, the first device and the second device may be a terminal device and a network device in an uplink, or may be a network device and a terminal device in a downlink. For example, the first device is a gNB, and the second device is a terminal device in coverage of the gNB.

In some embodiments, the first device and the second device may be a terminal device and an air platform in a service link, or an air platform and a terminal device in the service link in an NTN system. The air platform is, for example, a satellite, or a UAV system.

In some embodiments, the first device and the second device may be a satellite and a gateway of a feeder link, or a gateway and a satellite of the feeder link in the NTN system.

Referring to FIG. 5, the first device sends a first transport block, and the second device receives the first transport block. The first device and the second device perform data transmission in a unit of the first transport block. For a specific amount of transmitted data, a quantity of first transport blocks and a quantity of transmission times are related to a size (TBsize) of the first transport block. For example, when a size of the first transport block is larger, fewer transport blocks may be used to transmit a same quantity of bits.

The size of the first transport block is determined based on a first parameter. In some embodiments, the first parameter may be a coefficient for calculating the size of the first transport block, for example, a first coefficient may be a transmission factor β. In other words, the size of the first transport block may be determined based on a product of the first parameter and an initial size of the first transport block. The initial size of the first transport block may be referred to as a fourth parameter.

The initial size of the first transport block may be determined based on a quantity of physical resources, a code rate, a modulation scheme, and a quantity of spatial multiplexing layers. The quantity of physical resources may be determined based on resources allocated by a base station to the transport block. The code rate, the modulation scheme, and the quantity of spatial multiplexing layers may be determined based on a modulation and coding scheme (MCS) of the transport block. When allocating resources to the transport block and determining an MCS, the base station considers information such as a link-related parameter, a data size in a buffer (each logical channel group is corresponding to one buffer), a logical channel group priority, a quantity of to-be-scheduled users, and a user priority. In other words, the size of the first transport block may be determined based on the first parameter, the quantity of physical resources, the code rate, the modulation scheme, and the quantity of spatial multiplexing layers.

In some embodiments, the first device may obtain the first parameter by using the base station or terminal signaling. The terminal signaling may be one or more of radio resource control (RRC) signaling, a downlink control information (DCI) indication, configured grant (CG) information, and MAC CE. For example, when the first device is a terminal device, the base station may allow the terminal device to determine the first parameter by using the foregoing signaling.

The first parameter may be determined based on a second parameter. The second parameter may indicate channel transmission quality corresponding to the first transport block. The channel transmission quality may be determined based on a parameter such as reference signal received power (RSRP), reference signal receiving quality (RSRQ), and/or signal to interference plus noise ratio (SINR) of a transmission link. Based on the second parameter, the first device may adaptively change a size of a transport block according to quality of a transmission path, thereby improving spectrum utilization. For example, when the channel transmission quality is good, a larger transport block may be required after header bits added at each transport layer and/or other mandatory control information associated with payload bits in transmission are aggregated. After a size of the transport block is increased, a relatively small quantity of transport blocks may be used to transmit a same quantity of bits. Further, a small quantity of large transport blocks may have a comparable effective code rate compared with a plurality of small transport blocks. Therefore, increasing the size of a transport block may also lead to a proportional increase in data reliability and/or spectrum efficiency.

In some embodiments, the second parameter may include channel quality indication (CQI). The CQI represents a gradient value by using an index or an index range. The first parameter may be determined based on a CQI index. In other words, the CQI index may be associated with the first parameter. For example, each index of the CQI may correspond to a value of the first parameter. For another example, in an index range of the CQI, a value range of the first parameter may be set.

In a possible implementation, the CQI index may include a first index range and a second index range, and the first parameter includes a first value and a second value. The first index range of the CQI index corresponds to the first value, and the second index range corresponds to the second value. Herein, 16 indexes of the CQI in an NR system are used as an example. The 16 CQI indexes are classified into four index ranges, which are respectively corresponding to four values of the first parameter. Indexes 0 to 3 may correspond to one value of the first parameter, indexes 4 to 7 may correspond to another value of the first parameter, and so on.

In some embodiments, the second parameter may include a specific parameter indicating channel transmission quality. The second parameter is, for example, an SINR, a block error rate (BLER), a bit error rate (BER), or another parameter that may be interconverted with these parameters.

The first parameter may be determined based on the second parameter and a first threshold. In other words, the first parameter may vary with different values of the second parameter. In some embodiments, the first device may adaptively adjust a specific value of the first parameter according to a received SINR.

The first threshold may be set based on the second parameter. The first device may determine link quality by comparing the first threshold with the second parameter, so as to determine a value of the first parameter. In some embodiments, the first threshold may be set according to an SINR. For example, the first threshold may be $SINR_{target}$.

The SINR is used as an example. A higher SINR indicates better link quality. In some embodiments, if the SINR is greater than the first threshold, a value of the first parameter may belong to the first value range. If the SINR is less than the first threshold, a value of the first parameter may belong to the second value range. In other words, if the SINR is equal to the first threshold, the first parameter may be a value not in the first value range or the second value range.

It may be learned from the foregoing description that, when channel transmission quality is good, spectrum efficiency may be improved by increasing a size of the first transport block. In a possible implementation, when $SINR > SINR_{target}$, the first parameter may be greater than 1, and after the initial size of the first transport block is multiplied by the first coefficient, the size of the first transport block becomes larger. For example, the first parameter may be an integer greater than 1. When $SINR < SINR_{target}$, the first parameter may be less than 1, and the size of the first transport block becomes smaller after multiplication. For example, the first parameter may be a number less than 1. When $SINR = SINR_{target}$, the first parameter may be 1.

In some embodiments, the second parameter may include CQI and an SINR. For example, a value of the first parameter may be determined based on a CQI index, and the CQI index may be associated with the SINR.

It may be learned from the foregoing that a system is more efficient by dynamically adjusting the size of the transport block without significantly affecting the effective code rate. In a case in which a HARQ process is enabled, adjusting a size of a transport block based on channel quality helps reduce overheads of retransmission.

Specifically, when channel transmission quality is good, a probability of retransmission is low, and increasing the size of the first transport block may transmit more information bits within a limited time. In addition, increasing the size of the first transport block may reduce signaling that provides feedback and a quantity of HARQ processes. Further, when a transport block is large, adverse impacts such as an increase of HARQ processes, signaling increase and redundancy, an increase in processor load, and network congestion caused when a size of the transport block is small may be avoided or reduced. In addition, a large transport block may help reduce latency and other overheads on the air interface. For example, if the transport block is small, splitting efficiency is reduced when payload is split, and overheads may increase due to different headers from each of one or more L2 layers. In addition, HARQ process processing power and additional signaling fed back by ACK/NACK are also involved. In other words, in terms of device performance and network congestion on an air interface, a relatively large transport block is beneficial, especially for an NTN communications system. Compared with a relatively small transport block, control and/or an amount of other overhead signaling are significantly reduced for a relatively large transport block.

When the channel transmission quality is poor, a probability of retransmission increases, and a size of the first transport block may be reduced. Because when a link environment is poor, a relatively large transport block may cause relatively large BLER. When HARQ process is enabled, since a reduction in feedback signaling is not conducive to retransmission, a worse link budget is caused, and performance of an entire service deteriorates. Further, when channel quality is poor, packet loss and BLER are relatively high. To improve the BLER, the system continuously resends transport blocks. Relatively small transport blocks may reduce time and power required for retransmission.

The first parameter may be further determined based on a third parameter. The third parameter may indicate a channel transmission delay corresponding to the first transport block. It may be learned from the foregoing that some communications systems (for example, an NTN system) have a relatively long propagation delay. In a system with a long transmission delay, using a transport block of a relatively large size may effectively improve spectrum utilization when retransmission is disabled, or reduce a quantity of retransmissions when retransmission is enabled. For example, for an NTN system with MEO or GEO, larger transport blocks are more advantageous for longer RTTs.

The transmission delay is determined based on a distance between a sending device and a receiving device of the first transport block. Therefore, the third parameter may be determined based on the distance between the two communications devices. For example, when the first device is a terminal device of the NTN system, the third parameter may be determined based on a distance between the first device and the network device of the NTN system.

In some embodiments, the third parameter may be determined based on the first device and an orbital parameter of a satellite. The orbital parameter is, for example, an orbital period. For example, the orbital period is 24 hours for a GEO satellite, and a transmission delay is about 500 milliseconds. The third parameter may be set based on the transmission delay of 500 milliseconds, so as to determine the first parameter.

In a possible implementation, the first parameter may vary with a change in the orbital period. For example, the first parameter may increase proportionally with an increase in the orbital period. In other words, for MEO and HEO, a transport block should be as large as possible, and a change of the first parameter should be greater than that of LEO.

The first parameter may alternatively be determined based on the second parameter and the third parameter. In some embodiments, for a system with a relatively long propagation delay, the first device may adaptively change the size of the transport block based on quality of a transmission path and a transmission delay in order to accommodate this condition and meet a link budget.

The foregoing describes a communication method for adjusting a size of a transport block based on channel transmission quality and/or a channel transmission delay. In the method, adaptively adjusting a size of a transport block based on channel quality or a transmission delay helps reduce a quantity of HARQ feedback times or signaling, thereby reducing retransmission overheads. To further reduce overheads, a HARQ process may also be selectively enabled or disabled in communication of a transport block.

Enabling/disabling of HARQ feedback may be configured on a basis of each communication device and each HARQ process. If a HARQ process is disabled, there is no feedback for transmission. Further, disabling of a HARQ process and enabling of a HARQ process may alternatively be used in combination to configure each HARQ process associated with a communications device.

How to enable and disable each HARQ process to perform a more accurate ACK/NACK indication is also a problem that needs to be solved.

To solve this problem, an embodiment of the present application provides another wireless communication method. In the method, a HARQ process is enabled or disabled for corresponding data through indication of transmitted first information, thereby reducing retransmission overheads. The following specifically describes the wireless communication method with reference to FIG. 6.

Figure 6:
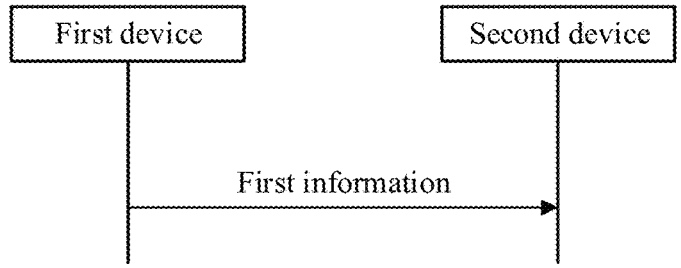
FIG. 6 is a schematic diagram of another wireless communication method according to an embodiment of the present application.

The communication method shown in FIG. 6 is also described from a perspective of communication between the first device and the second device. The first device and the second device are described in detail in FIG. 5, and details are not described herein again.

Referring to FIG. 6, the first device sends the first information, and the second device receives the first information. By receiving and sending the first information, the first device and the second device may jointly determine indication content of the first information.

The first information is used to indicate enabling or disabling of a HARQ process corresponding to first data. In some embodiments, the first information may be an ACK/NACK indication.

The first data may correspond to a MAC PDU carried in a first transport block. In some embodiments, the first data may be a data packet corresponding to the first information, for example, the first data may be one MAC SDU of the MAC PDU in FIG. 4. In some embodiments, the first data may alternatively be a plurality of data packets corresponding to the first information, for example, a plurality of MAC SDUs corresponding to the MAC PDU.

In some embodiments, a size of the first transport block may be determined according to the method in FIG. 5, and details are not described herein again. During retransmission, a transport block carrying an ACK/NACK indication indicates that there is a feedback, and a transport block carrying a disable ACK/NACK indication indicates that no retransmission information is fed back. Therefore, the physical layer knows a transport block that needs to feed back ACK/NACK and a transport block that does not need to feed back ACK/NACK.

The first data may have different importance levels. In some embodiments, the first data may be useful data in actual transmission, and has a relatively high importance level. Important data may alternatively be represented by payload. In some embodiments, the first data may be background data generated in actual transmission, and the data is relatively unimportant data, for example, background noise generated during a call. The relatively unimportant data may alternatively be represented by an unimportant load.

In some embodiments, the first information may determine the indication content based on an importance level of the first data. For example, when the first data is relatively important, the first information may indicate enabling of a HARQ process corresponding to the data. When the first data is relatively unimportant, the first information may indicate disabling of the HARQ process corresponding to the data.

In a possible implementation, the importance level of the first data may be indicated by using a header of the data at a MAC layer. For example, the first information is added to the header of the MAC layer to indicate the importance level of the first data. In the first information, 1 may be used to indicate that a data packet is important, and 0 may be used to indicate that a data packet is relatively unimportant. Alternatively, in the first information, 1 may be used to indicate a payload of data, and 0 may be used to indicate an unimportant load.

In some embodiments, the first information may be used to determine the indication content depending on whether the first data enables a retransmission process other than the HARQ process. For example, when an operation mode of the first data at an RLC layer is an RLC-AM mode, it indicates that the data enables an automatic repeat request (ARQ) process, and the first information may indicate disabling of a HARQ process corresponding to the data. In contrast, when the operation mode of the first data at the RLC layer is an RLC-UM and RLC-TM mode, the first information may indicate enabling of the HARQ process corresponding to the data.

The first information may be located in a MAC PDU corresponding to the first data, so as to indicate enabling or disabling of the HARQ process corresponding to the first data. The first information may alternatively be located in RRC signaling or DCI information.

In some embodiments, when the first data corresponds to one MAC SDU in a MAC PDU, the first information may be located in a header of the MAC SDU. The header of the MAC SDU may be a header from a PDCP layer, the RLC layer, or the MAC layer. In a possible implementation, the first information may be used for indication by using a reserved bit in the header. For example, a subheader at the MAC layer shown in FIG. 4 includes one reserved bit R, and the first information may use the reserved bit for indication. When R is 1, it indicates that the data is relatively important, and a corresponding HARQ process needs to be enabled. When R is 0, it indicates that the data is not important, and a corresponding HARQ process may be disabled.

In some embodiments, the first information may be located in a MAC CE of a MAC PDU where the first data is located. It may be learned from FIG. 4 that a MAC PDU formed at the MAC layer includes a MAC CE. When the first information for disabling and enabling the HARQ process is added to the MAC CE, the first information may indicate, in the MAC PDU, an SDU for which the HARQ process needs to be enabled, and an SDU for which the HARQ process needs to be disabled.

In some embodiments, the first data is one piece of data in a plurality of pieces of data corresponding to a first MAC PDU, and the plurality of pieces of data may have a same importance level. For example, when a MAC PDU is formed at the MAC layer, a plurality of data packets corresponding to a plurality of MAC SDUs may have different importance levels. A communications device may classify the plurality of MAC SDUs, and separately perform header addition and encapsulation. MAC SDUs with a same importance level are then packaged in one MAC PDU, so that a plurality of pieces of data in one MAC PDU may have a same policy of enabling or disabling the HARQ process. When the plurality of pieces of data in one MAC PDU has a same retransmission policy, splitting does not need to be performed, which helps reduce overheads.

Figure 7:
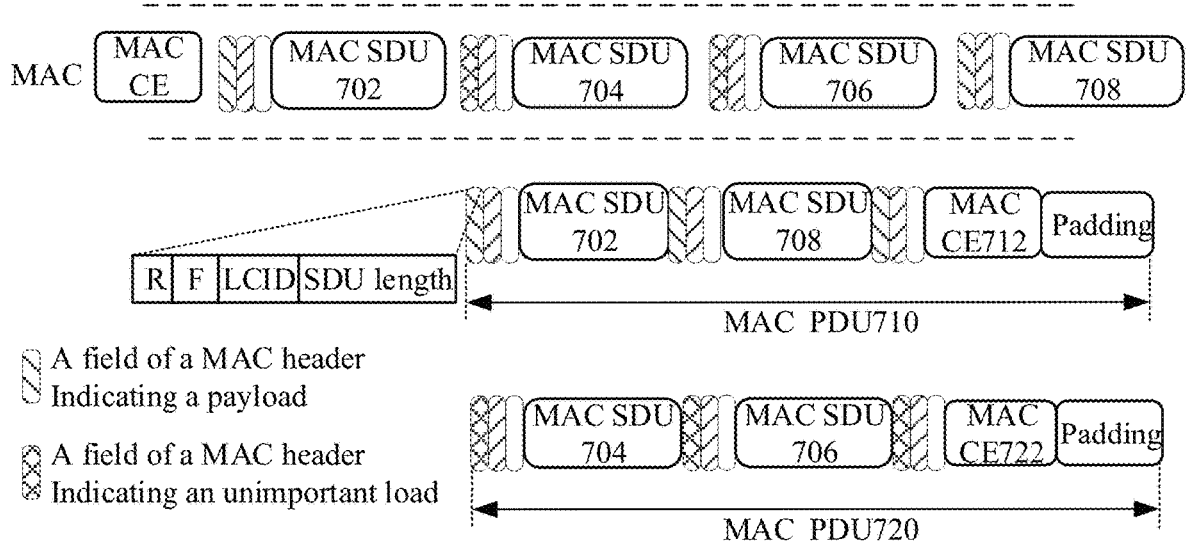
FIG. 7 is a schematic diagram of generating a MAC PDU corresponding to first information in the method illustrated in FIG. 6.

For ease of understanding, the following describes a process in which a MAC PDU is generated at the MAC layer by using a packet with reference to FIG. 7. Referring to FIG. 7, there are four MAC SDUs at the MAC layer, which are respectively a MAC SDU 702, a MAC SDU 704, a MAC SDU 706, and a MAC SDU 708. According to a header of each MAC SDU, it may be determined that data of the MAC SDU 702 and data of the MAC SDU 708 are payloads, and data of the MAC SDU 704 and data of the MAC SDU 706 are unimportant loads.

As shown in FIG. 7, four MAC SDUs are separately packaged according to an importance level, to form a MAC PDU 710 and a MAC PDU 720. The MAC PDU 710 includes the MAC SDU 702 and the MAC SDU 708 with data of payload, a MAC CE 712, and a padding field. A header of the MAC CE 712 indicates that a payload is included. The MAC PDU 720 includes the MAC SDU 704 and the MAC SDU 706 with data of unimportant load, a MAC CE 722, and a padding field. A header of the MAC CE 722 indicates that an unimportant load is included.

The foregoing packaging process causes a delay in a MAC PDU generation process, which is acceptable for a system with a relatively long transmission delay. For example, when packaging of different importance levels is performed in an NTN system, because a delay of an RTT is very high, a delay caused by packaging at the MAC layer may be ignored.

The foregoing describes in detail a communication method for reducing retransmission overheads with reference to FIG. 5 to FIG. 7. FIG. 5 illustrates the method of adaptively adjusting a size of a transport block, and FIG. 6 illustrates the method of indicating enabling or disabling of a HARQ process by using first information. For ease of understanding, the following uses an example in which a first parameter is a transmission factor in an uplink (UL) of NTN communication, to describe a method of how to selectively enable and disable UL HARQ retransmission.

Example 1: A size of a transport block is changed by using a transmission factor determined according to link quality feedback information, and whether to enable or disable a HARQ process is determined depending on a payload of a service.

Example 2: A size of a transport block is changed by using a transmission factor determined according to link quality feedback information, and whether to enable or disable a HARQ process is determined by adding header and performing encapsulation on MAC SDUs according to categories at the MAC layer based on a payload of a service.

Example 3: It is determined that a group of MAC CEs are allowed to be sent by using one or more specific uplink HARQ processes, and RRC signaling, DCI information, or a MAC CE is used to determine control signaling of enabling or disabling HARQ process.

In some communications systems (for example, an NB-IoT system), asynchronous adaptive HARQ is supported in uplink and downlink. A communications device determines whether to perform retransmission according to received DCI, and a quantity of retransmissions is relatively high. For example, in NB-IoT, after receiving a narrowband physical downlink shared channel (NPDSCH), a terminal device feeds back a HARQ ACK by using a narrowband physical uplink shared channel (NPUSCH) format 2, and a quantity of retransmissions is high.

For a communications system with a relatively high quantity of retransmissions, a delay in an environment with a relatively long transmission delay (for example, an NTN) cannot be accepted, and a maximum quantity of transmissions needs to be limited in DCI.

The method embodiments of the present application are described in detail above with reference to FIG. 1 to FIG. 7. The apparatus embodiments of the present application are described in detail below with reference to FIG. 8 to FIG. 10. It should be understood that the description of the apparatus embodiments corresponds to the description of the method embodiments, and therefore, for parts that are not described in detail, reference may be made to the foregoing method embodiments.

Figure 8:
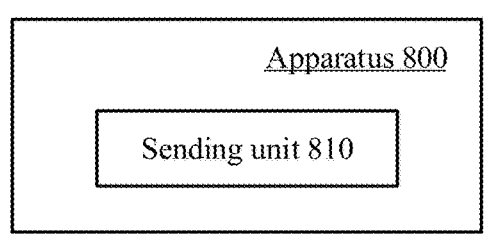
FIG. 8 is a schematic structural diagram of a wireless communications apparatus according to an embodiment of the present application.

FIG. 8 is a schematic block diagram of a communications apparatus according to an embodiment of the present application. The apparatus 800 may be any one of the first devices described above. The apparatus 800 shown in FIG. 8 includes a sending unit 810.

The sending unit 810 may be configured to send a first transport block, where a size of the first transport block is determined based on a first parameter, the first parameter is determined based on one or more of the following parameters: a second parameter, used to indicate channel transmission quality corresponding to the first transport block; and a third parameter, used to indicate a channel transmission delay corresponding to the first transport block.

Optionally, the second parameter includes one or more of the following parameters: a channel quality indication and a signal to interference plus noise ratio.

Optionally, the second parameter includes the channel quality indication, and the first parameter is determined based on an index of the channel quality indication.

Optionally, the index of the channel quality indicator includes a first index range and a second index range, the first parameter includes a first value and a second value, the first index range corresponds to the first value, and the second index range corresponds to the second value.

Optionally, the second parameter includes the signal to interference plus noise ratio, and the first parameter is determined based on the signal to interference plus noise ratio and a first threshold.

Optionally, if the signal to interference plus noise ratio is greater than the first threshold, a value of the first parameter belongs to a first value range; or if the signal to interference plus noise ratio is less than the first threshold, a value of the first parameter belongs to a second value range.

Optionally, if the signal to interference plus noise ratio is greater than the first threshold, the first parameter is greater than 1; or if the signal to interference plus noise ratio is less than the first threshold, the first parameter is less than 1.

Optionally, the size of the first transport block is determined based on a product of the first parameter and a fourth parameter, and the fourth parameter is an initial size of the first transport block.

Optionally, the fourth parameter is determined based on one or more of the following: a quantity of physical resources; a code rate; a modulation scheme; and a quantity of spatial multiplexing layers.

Optionally, the third parameter is determined based on a distance between the first device and a network device in a non-terrestrial network.

Optionally, the third parameter is determined based on the first device and an orbital parameter of a satellite.

Figure 9:
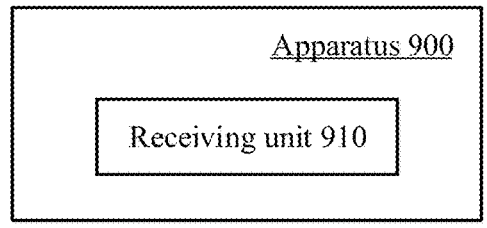
FIG. 9 is a schematic structural diagram of another wireless communications apparatus according to an embodiment of the present application.

FIG. 9 is a schematic block diagram of a communications apparatus according to an embodiment of the present application. The apparatus 900 may be any one of the second devices described above. The apparatus 900 shown in FIG. 9 includes a receiving unit 910.

The receiving unit 910 may be configured to receive a first transport block, where a size of the first transport block is determined based on a first parameter, the first parameter is determined based on one or more of the following parameters: a second parameter, used to indicate channel transmission quality corresponding to the first transport block; and a third parameter, used to indicate a channel transmission delay corresponding to the first transport block.

Optionally, the second parameter includes one or more of the following parameters: a channel quality indication and a signal to interference plus noise ratio.

Optionally, the second parameter includes the channel quality indication, and the first parameter is determined based on an index of the channel quality indication.

Optionally, the index of the channel quality indicator includes a first index range and a second index range, the first parameter includes a first value and a second value, the first index range corresponds to the first value, and the second index range corresponds to the second value.

Optionally, the second parameter includes the signal to interference plus noise ratio, and the first parameter is determined based on the signal to interference plus noise ratio and a first threshold.

Optionally, if the signal to interference plus noise ratio is greater than the first threshold, a value of the first parameter belongs to a first value range; or if the signal to interference plus noise ratio is less than the first threshold, a value of the first parameter belongs to a second value range.

Optionally, if the signal to interference plus noise ratio is greater than the first threshold, the first parameter is greater than 1; or if the signal to interference plus noise ratio is less than the first threshold, the first parameter is less than 1.

Optionally, the size of the first transport block is determined based on a product of the first parameter and a fourth parameter, and the fourth parameter is an initial size of the first transport block.

Optionally, the fourth parameter is determined based on one or more of the following: a quantity of physical resources; a code rate; a modulation scheme; and a quantity of spatial multiplexing layers.

Optionally, the third parameter is determined based on a distance between the first device for sending the first transport block and a network device in a non-terrestrial network.

Optionally, the third parameter is determined based on the first device and an orbital parameter of a satellite.

An embodiment of the present application further provides a wireless communications apparatus, the apparatus is configured as a first device, and the first device includes a sending unit.

The sending unit may be configured to send first information, and the first information is used to indicate enabling or disabling of a HARQ process corresponding to first data.

Optionally, the first data corresponds to a first MAC SDU, and the first information is located in a header of the first MAC SDU.

Optionally, the first information is indicated by a reserved bit in the header.

Optionally, the first data corresponds to a first MAC PDU, and the first information is located in a MAC CE of the first MAC PDU.

Optionally, the first data corresponds to a first MAC PDU, the first MAC PDU is carried in a first transport block, a size of the first transport block is determined based on a first parameter, the first parameter is determined based on one or more of the following parameters: a second parameter, used to indicate channel transmission quality corresponding to the first transport block; and a third parameter, used to indicate a channel transmission delay corresponding to the first transport block.

Optionally, the first information is determined based on one or more of the following information: an importance level of the first data; and whether the first data enables a retransmission process other than the HARQ process.

Optionally, the first data is one piece of data in a plurality of pieces of data corresponding to a first MAC PDU, and the plurality of pieces of data have a same importance level.

An embodiment of the present application further provides a wireless communications apparatus, where the apparatus is configured as a second device, and the second device includes a receiving unit.

The receiving unit may be configured to receive first information, where the first information is used to indicate enabling or disabling of a HARQ process corresponding to first data.

Optionally, the first data corresponds to a first MAC SDU, and the first information is located in a header of the first MAC SDU.

Optionally, the first information is indicated by a reserved bit in the header.

Optionally, the first data corresponds to a first MAC PDU, and the first information is located in a MAC CE of the first MAC PDU.

Optionally, the first data corresponds to a first MAC PDU, the first MAC PDU is carried in a first transport block, a size of the first transport block is determined based on a first parameter, the first parameter is determined based on one or more of the following parameters: a second parameter, used to indicate channel transmission quality corresponding to the first transport block; and a third parameter, used to indicate a channel transmission delay corresponding to the first transport block.

Optionally, the first information is determined based on one or more of the following information: an importance level of the first data; and whether the first data enables a retransmission process other than the HARQ process.

Optionally, the first data is one piece of data in a plurality of pieces of data corresponding to a first MAC PDU, and the plurality of pieces of data have a same importance level.

Figure 10:
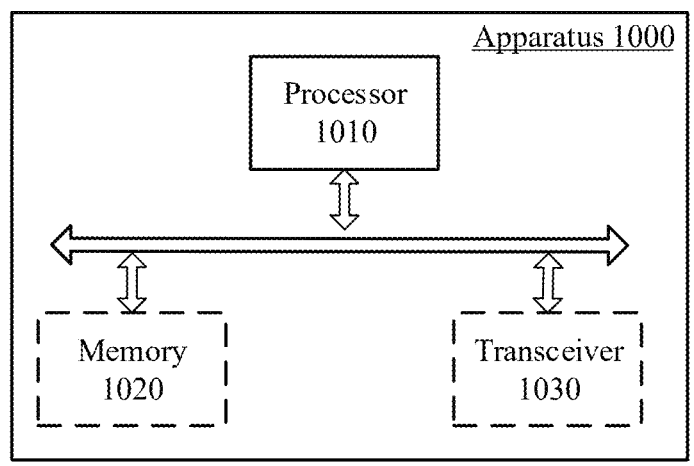
FIG. 10 is a schematic structural diagram of a communications apparatus according to an embodiment of the present application.

FIG. 10 is a schematic structural diagram of a communications apparatus according to an embodiment of the present application. The dashed lines in FIG. 10 indicate that the unit or module is optional. The apparatus 1000 may be configured to implement the methods described in the foregoing method embodiments. The apparatus 1000 may be a chip or a terminal device.

The apparatus 1000 may include one or more processors 1010. The processor 1010 may allow the apparatus 1000 to implement the methods described in the foregoing method embodiments. The processor 1010 may be a general-purpose processor or a dedicated processor. For example, the processor may be a central processing unit (CPU). Alternatively, the processor may be another general-purpose processor, a digital signal processor (DSP), an application-specific integrated circuit (ASIC), a field-programmable gate array (FPGA) or another programmable logic device, a discrete gate or transistor logic device, a discrete hardware component, or the like. The general-purpose processor may be a microprocessor, or the processor may be any conventional processor or the like.

The apparatus 1000 may further include one or more memories 1020. The memory 1020 stores a program that may be executed by the processor 1010 to cause the processor 1010 to perform the methods described in the foregoing method embodiments. The memory 1020 may be independent of the processor 1010 or may be integrated into the processor 1010.

The apparatus 1000 may further include a transceiver 1030. The processor 1010 may communicate with another device or chip through the transceiver 1030. For example, the processor 1010 may transmit and receive data to and from another device or chip through the transceiver 1030.

An embodiment of the present application further provides a computer-readable storage medium for storing a program. The computer-readable storage medium may be applied to the terminal or the network device provided in the embodiments of the present application, and the program causes a computer to perform the methods to be performed by the terminal or the network device in various embodiments of the present application.

An embodiment of the present application further provides a computer program product. The computer program product includes a program. The computer program product may be applied to the terminal or the network device provided in the embodiments of the present application, and the program causes a computer to perform the methods to be performed by the terminal or the network device in various embodiments of the present application.

An embodiment of the present application further provides a computer program. The computer program may be applied to the terminal or the network device provided in the embodiments of the present application, and the computer program causes a computer to perform the methods to be performed by the terminal or the network device in various embodiments of the present application.

The terms "system" and "network" in the present application may be used interchangeably. In addition, the terms used in the present application are only used to explain the specific embodiments of the present application, and are not intended to limit the present application. The terms "first", "second", "third", "fourth", and the like in the specification, claims, and drawings of the present application are used to distinguish between different objects, rather than to describe a specific order. In addition, the terms "include" and "have" and any variations thereof are intended to cover a non-exclusive inclusion.

In the embodiments of the present application, "indicate" mentioned herein may refer to a direct indication, or may refer to an indirect indication, or may mean that there is an association relationship. For example, A indicates B, which may mean that A directly indicates B, for example, B may be obtained by means of A; or may mean that A indirectly indicates B, for example, A indicates C, and B may be obtained by means of C; or may mean that there is an association relationship between A and B.

In the embodiments of the present application, the term "corresponding" may mean that there is a direct or indirect correspondence between the two, or may mean that there is an association relationship between the two, which may also be a relationship such as indicating and being indicated, or configuring and being configured.

In the embodiments of the present application, the "protocol" may refer to a standard protocol in the communications field, and may include, for example, an LTE protocol, an NR protocol, and a related protocol applied to a future communications system, which is not limited in the present application.

In the embodiments of the present application, determining B based on A does not mean determining B based only on A, but instead B may be determined based on A and/or other information.

In the embodiments of the present application, the term "and/or" is merely an association relationship that describes associated objects, and represents that there may be three relationships. For example, A and/or B may represent three cases: only A exists, both A and B exist, and only B exists. In addition, the character "/" herein generally indicates an "or" relationship between the associated objects.

In several embodiments provided in the present application, it should be understood that, the disclosed system, apparatus, and method may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatus or units may be implemented in electronic, mechanical, or other forms.

The units described as separate components may be or may not be physically separated, and the components displayed as units may be or may not be physical units, that is, may be located in one place or distributed on a plurality of network units. Some or all of the units may be selected according to actual needs to achieve the objective of the solutions of the embodiments.

In addition, function units in the embodiments of the present application may be integrated into one processing unit, or each of the units may exist alone physically, or two or more units may be integrated into one unit.

All or some of the foregoing embodiments may be implemented by using software, hardware, firmware, or any combination thereof. When software is used to implement embodiments, the foregoing embodiments may be implemented completely or partially in a form of a computer program product. The computer program product includes one or more computer instructions. When the computer program instructions are loaded and executed on a computer, the procedures or functions according to the embodiments of the present application are completely or partially generated. The computer may be a general-purpose computer, a dedicated computer, a computer network, or another programmable apparatus. The computer instructions may be stored in a computer-readable storage medium or transmitted from one computer-readable storage medium to another computer-readable storage medium. For example, the computer instructions may be transmitted from a website, computer, server, or data center to another website, computer, server, or data center in a wired (such as a coaxial cable, an optical fiber, and a digital subscriber line (DSL)) manner or a wireless (such as infrared, wireless, and microwave) manner. The computer-readable storage medium may be any usable medium readable by the computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, a solid-state drive (SSD)), or the like.

The foregoing descriptions are merely specific implementations of the present application, but the protection scope of the present application is not limited thereto. Any variation or replacement readily figured out by a person skilled in the art within the technical scope disclosed in the present application shall fall within the protection scope of the present application. Therefore, the protection scope of the present application shall be subject to the protection scope of the claims.

What is claimed is:

1. A wireless communication method, comprising:
sending, by a first device in a non-terrestrial network, first information, wherein the first information indicates enabling or disabling of a hybrid automatic repeat request (HARQ) process corresponding to first data, wherein the first information is sent in a radio resource control (RRC) signaling, the first data corresponds to a first media access control (MAC) packet data unit (PDU) and the first data is carried in a first transport block, a size of the first transport block is determined based on a multiplication product of an initial size of the first transport block and a first parameter indicated in downlink control information (DCI).

2. The method according to claim 1, wherein the first information is determined based on one or more of the following information:
an importance level of the first data; or
whether the first data enables a retransmission process other than the HARQ process.

3. The method according to claim 1, wherein the first information is indicated by a reserved bit in a header.

4. The method according to claim 1, wherein the first parameter is determined based on one or more of the following parameters:
a second parameter that indicates channel transmission quality corresponding to the first transport block; or
a third parameter that indicates a channel transmission delay corresponding to the first transport block.

5. The method according to claim 1, wherein the first data is one piece of data in a plurality of pieces of data corresponding to the first MAC PDU, and the plurality of pieces of data have a same importance level.

6. An apparatus, comprising:
at least one processor; and
one or more non-transitory computer-readable storage media coupled to the at least one processor and storing programming instructions for execution by the at least one processor, wherein the programming instructions, when executed, cause the apparatus to perform operations comprising:
sending, by the apparatus operating in a non-terrestrial network, first information, wherein the first information indicates enabling or disabling of a hybrid automatic repeat request (HARQ) process corresponding to first data, wherein the first information is sent in a radio resource control (RRC) signaling the first data corresponds to a first media access control (MAC) packet data unit (PDU) and the first data is carried in a first transport block, a size of the first transport block is determined based on a multiplication product of an initial size of the first transport block and a first parameter indicated in downlink control information (DCI).

7. The apparatus according to claim 6, wherein the first information is determined based on one or more of the following information:
an importance level of the first data; or
whether the first data enables a retransmission process other than the HARQ process.

8. The apparatus according to claim 6, wherein the first information is indicated by a reserved bit in a header.

9. The apparatus according to claim 6, wherein the first parameter is determined based on one or more of the following parameters:
a second parameter that indicates channel transmission quality corresponding to the first transport block; or
a third parameter that indicates a channel transmission delay corresponding to the first transport block.

10. The apparatus according to claim 6, wherein the first data is one piece of data in a plurality of pieces of data corresponding to the first MAC PDU, and the plurality of pieces of data have a same importance level.

11. A wireless communication method, comprising:
receiving, by a first device in a non-terrestrial network, first information, wherein the first information indicates enabling or disabling of a hybrid automatic repeat request (HARQ) process corresponding to first data, wherein the first information is sent in a radio resource control (RRC) signaling, the first data corresponds to a first media access control (MAC) packet data unit (PDU) and the first data is carried in a first transport block, a size of the first transport block is determined based on a multiplication product of an initial size of the first transport block and a first parameter indicated in downlink control information (DCI).

12. The method according to claim 11, wherein the first information is indicated by a reserved bit in a header.

13. The method according to claim 11, wherein first parameter is determined based on one or more of the following parameters:
a second parameter that indicates channel transmission quality corresponding to the first transport block; or
a third parameter that indicates a channel transmission delay corresponding to the first transport block.

14. The method according to claim 11, wherein the first data is one piece of data in a plurality of pieces of data corresponding to the first MAC PDU, and the plurality of pieces of data have a same importance level.

15. The method according to claim 11, wherein the first information is determined based on one or more of the following information:
an importance level of the first data; or
whether the first data enables a retransmission process other than the HARQ process.

* * * * *